(12) United States Patent
Yamada

(10) Patent No.: US 10,752,021 B2
(45) Date of Patent: Aug. 25, 2020

(54) PRINT CONTROL DEVICE, PRINTING DEVICE, AND SPECIFYING PRINT OBJECTS TO DETERMINE AN ATTRIBUTE FOR REPLACING THE PRINT OBJECTS WITH A DIFFERENT PRINT OBJECT

(71) Applicant: SEIKO EPSON CORPORATION, Tokyo (JP)

(72) Inventor: Yusuke Yamada, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/435,433

(22) Filed: Jun. 7, 2019

(65) Prior Publication Data
US 2019/0291465 A1    Sep. 26, 2019

Related U.S. Application Data

(63) Continuation of application No. 14/772,356, filed as application No. PCT/JP2014/001716 on Mar. 25, 2014, now abandoned.

(30) Foreign Application Priority Data

Mar. 29, 2013  (JP) ................... 2013-072437
Mar. 29, 2013  (JP) ................... 2013-072438
Mar. 29, 2013  (JP) ................... 2013-072439

(51) Int. Cl.
G06F 3/12        (2006.01)
B41J 5/30        (2006.01)
(Continued)

(52) U.S. Cl.
CPC . *B41J 5/30* (2013.01); *B41J 2/21* (2013.01); *B41J 3/46* (2013.01); *B41J 11/008* (2013.01);
(Continued)

(58) Field of Classification Search
None
See application file for complete search history.

(56) References Cited

U.S. PATENT DOCUMENTS 4,912,019 A    3/1990   Nebe et al.
4,925,771 A    5/1990   Nebe et al.
(Continued)

FOREIGN PATENT DOCUMENTS

JP    02-025848 A    1/1990
JP    H02-025348 A   1/1990
(Continued)

*Primary Examiner* — Benny Q Tieu
*Assistant Examiner* — Haris Sabah
(74) *Attorney, Agent, or Firm* — Foley & Lardner LLP

(57) ABSTRACT

Colorful printing using more colors based on data for printing with a single color or few colors is enabled.
A printer control unit 15 includes a print data acquisition unit 15c, print data processing unit 15d, and print control unit 15e. The print data acquisition unit 15c acquires data for a print object and a command specifying the print position of the print object. Based on the print position specified by the command acquired by the print data acquisition unit 15c, the print data processing unit 15d applies a process setting an attribute of the print object, or a process replacing the print object with another print object.

12 Claims, 7 Drawing Sheets

(51) Int. Cl.
    *B41J 3/46*         (2006.01)
    *B41J 2/21*         (2006.01)
    *B41J 11/00*       (2006.01)
    *H04N 1/54*       (2006.01)
    *H04N 1/56*       (2006.01)
    *G06F 40/106*     (2020.01)
    *G06K 15/02*      (2006.01)
    *G06K 9/00*       (2006.01)
    *H04N 1/405*      (2006.01)
    *G01J 3/46*       (2006.01)

(52) U.S. Cl.
    CPC .......... *G06F 3/1206* (2013.01); *G06F 3/1215* (2013.01); *G06F 3/1243* (2013.01); *G06F 3/1285* (2013.01); *H04N 1/54* (2013.01); *H04N 1/56* (2013.01); *G01J 3/463* (2013.01); *G06F 40/106* (2020.01); *G06K 9/00442* (2013.01); *G06K 9/00469* (2013.01); *G06K 15/1885* (2013.01); *H04N 1/4057* (2013.01); *H04N 2201/0082* (2013.01)

(56) References Cited

U.S. PATENT DOCUMENTS

| | | |
|---|---|---|
| 2004/0012816 A1 | 1/2004 | Minowa |
| 2006/0215209 A1 | 9/2006 | Takahashi |
| 2008/0123142 A1 | 5/2008 | Minowa |
| 2009/0323089 A1* | 12/2009 | Hayasaki ............... H04N 1/642 358/1.9 |
| 2010/0007902 A1 | 1/2010 | Kikuchi |
| 2011/0043836 A1 | 2/2011 | Yanagisawa |
| 2012/0236366 A1 | 9/2012 | Imai |
| 2013/0342854 A1 | 12/2013 | Takamoto |
| 2013/0342860 A1 | 12/2013 | Ono |

FOREIGN PATENT DOCUMENTS

| | | |
|---|---|---|
| JP | H05-270063 A | 10/1993 |
| JP | 07-223346 A | 8/1995 |
| JP | 2003-266804 A | 9/2003 |
| JP | 2009-171254 A | 7/2009 |
| JP | 2011-042103 A | 3/2011 |

\* cited by examiner

PRINT CONTROL DEVICE, PRINTING DEVICE, AND SPECIFYING PRINT OBJECTS TO DETERMINE AN ATTRIBUTE FOR REPLACING THE PRINT OBJECTS WITH A DIFFERENT PRINT OBJECT

The present application is a Continuation of U.S. application Ser. No. 14/772,356, filed Sep. 2, 2015, which is a U.S. National Phase of PCT Application No. PCT/JP2014/001716, filed Mar. 25, 2014, which claims the benefit of and priority to Japan Patent Application No. 2013-072437, filed Mar. 29, 2013, Japan Patent Application NO. 2013-072438, filed on Mar. 29, 2013 and Japan Patent Application No. 2013-072439, filed on Mar. 29, 2013, the entire contents of which are incorporated herein by reference.

TECHNICAL FIELD

The present invention relates to a print control device that processes data used for printing, to a printing device, a data processing method, and a print control device configuration method.

BACKGROUND

Devices that enable printing with multiple colors based on print commands for monochrome printing are known from the literature (see, for example, PTL 1). When a color for printing text and a color for printing an image are preset and a monochrome print command is input, the device described in PTL 1 prints the text and image using the set print color.

CITATION LIST

Patent Literature

PTL 1: JP-A-2003-266804

SUMMARY OF INVENTION

Technical Problem

The colors for printing text and images are limited with the device described in PTL 1. As a result, a method enabling printing with more colors, such as differentiating and printing plural text and image objects with different colors, is desirable.

Solution to Problem

The present invention is directed to solving at least part of the foregoing problem, and can be achieved by the embodiments and examples described below.

Example 1

A print control device that outputs data to be printed in more print colors than the input print data when print data to be printed in one or a plurality of print colors is input, the print control device including: an acquisition means that acquires data denoting a print object contained in the print data, and a command specifying the print position of the print object; and a processing means that, based on the print position specified by the command acquired by the acquisition means, executes a print control process including a process that determines an attribute of the print object or a process that replaces the print object with a different print object.

This aspect of the invention executes a process that determines the attributes related to printing a print object, or replacing a print object with another print object, based on the print position of the print object. As a result, processes that increase the number of colors for printing print objects or replace a print object with a different print object with more colors can be executed, and data enabling more colorful printing can be generated. In addition, print data for a target print object simply needs to contain a command specifying the print position, and there is no limitation on the print data that may be input. Processes such as increasing the number of print colors can therefore be applied to a wide range of input print data for more colorful printing.

Example 2

The print control device described above, wherein: the print position of the print object, and the content of the process executed by the processing means on the print object, are set relationally; and in the print control process, the processing means executes a process on the print object according to the content set relationally to the print position the command specifies for the print object.

Thus comprised, print objects can be processed according to process content previously set relationally to the print positions. The print control device can therefore quickly process print objects based on input print data.

Example 3

The print control device described above, wherein: in the print control process, the processing means sets the print color of the print object to a color set according to the print position specified by the command acquired by the acquisition means.

This aspect of the invention determines the print color of a print object based on the print position of the print object. This enables assigning a different print color to a print object set for monochrome printing. Different print colors can also be set for plural print objects at different print positions. Data for colorful printing can therefore be output.

Example 4

The print control device described above, wherein: in the print control process, the processing means determines the print color of the print object based on the content of the print object and the print position specified by the command acquired by the acquisition means.

Thus comprised, the content of a print object and the print position of the print object are reflected in the process that determines the print color of the print object. As a result, different print colors can be assigned to print objects printed at the same print position according to the content of the object. Data for more colorful printing can therefore be output.

Example 5

The print control device described above, wherein: the command is a command that, for a printout printed in page units, specifies the print position of the print object on the page.

This aspect of the invention can process print data containing a command specifying the print position of a print object on a page. As a result, because the print data that can be processed is not limited, processes such as increasing the number of print colors can be applied to a wide range of input print data, enabling colorful printing.

Example 6

A print control device that outputs data to be printed in more print colors than the input print data when print data to be printed in one or a plurality of print colors is input, wherein: the print data includes data denoting a print object and a command specifying the print position of the print object; the print control device comprising a configuration means that, when a configuration command that configures processing the print objects printed at each print position relationally to a pattern related to a combination of plural print positions is input, configures the process applied to the pattern and the print objects based on the configuration command; an acquisition means that acquires data denoting the print objects and a command specifying the print positions of the print objects; and a processing means that, when the print positions of the plural print objects specified by plural commands acquired by the acquisition means match the pattern, executes a print control process including a process that determines an attribute related to printing the print object, or a process that replaces the print object with a different print object.

When the input print data matches a set pattern, this aspect of the invention determines a printing attribute for a print object in the print data or replaces the print object with a different print object. As a result, a process that increases the number of print colors in a print object, or replaces a print object with another print object having more print colors can be executed, and data enabling more colorful printing can be generated. By setting a pattern related to a combination of plural print positions as the condition for executing the process, the print data to process can be selected from print data input for a wide variety of print jobs. A desired print job can therefore be identified using detailed conditions, the defined process applied to only that print job, and more diverse printing is possible. A pattern related to a combination of plural print positions and the process applied to the objects can also be easily set using a configuration command.

Example 7

The print control device described above, wherein: the configuration means sets an attribute of the printing format of the print objects printed at the print positions relationally to the pattern based on the configuration command; and the processing means executes a print control process that sets an attribute set relationally to the print positions specified by the commands as an attribute related to printing each of the print objects.

Thus comprised, when the input print data matches a pattern, attributes of the printing format can be determined for each print object in the print data based on the print position of each print object. As a result, plural objects can be individually processed for more diverse printing.

Example 8

The print control device described above, wherein: the attribute the processing means sets is an attribute specifying one or more of the print color of the print object, the printed size, a print style, a font used in printing, the type of symbol or barcode used in printing, a background color, and a foreground color.

Thus comprised, the print color of a print object, the size an object is printed, the print style, the font used for printing, the type of symbol or barcode used for printing, a background color, and a foreground color can be set for print objects in the input print data. Printing in many different format is therefore possible.

Example 9

The print control device described above, wherein: the pattern is a combination of plural print positions; and the processing means executes the print control process when the print positions of plural print objects specified by the plural commands acquired by the acquisition means match the combination of the pattern.

This aspect of the invention executes a process related to the printing format of the print objects when the combination of plural print positions contained in the input print data matches a pattern set by the configuration command. As a result, print data to be processed can be identified more accurately by the pattern of print positions.

Example 10

The print control device described above, wherein: the processing means executes the print control process when the print position of a print object including text specified by the command matches the combination of the pattern.

When the input print data matches a pattern set by the configuration command and a print object contains text, this aspect of the invention executes a process related to the printing format of the print object. As a result, the print data to be processed can be identified more accurately.

Example 11

A print control device that outputs data to be printed in more print colors than the input print data when print data to be printed in one or a plurality of print colors is input, wherein: the print data includes data denoting a print object to be printed and a command specifying the print position of the print object; and a pattern related to a combination of plural print positions is set; the print control device comprising an acquisition means that acquires data denoting the print objects and a command specifying the print positions of the print objects; and a processing means that, when the print positions of the plural print objects specified by plural commands acquired by the acquisition means match the pattern, executes a print control process including a process that determines an attribute about printing of the object, or a process that replaces the print object with another print object.

When the input print data matches a set pattern, this aspect of the invention determines a printing attribute for a print object in the print data or replaces the print object with a different print object. As a result, a process that increases the number of print colors in a print object, or replaces a print object with another print object having more print colors can be executed, and data enabling more colorful printing can be generated. By setting a pattern related to a combination of plural print positions as the condition for executing the process, the print data to process can be selected from print data input for a wide variety of print jobs.

A desired print job can therefore be identified using detailed conditions, the defined process applied to only that print job, and more diverse printing is possible.

Example 12

The print control device described above, wherein: an attribute related to a printing format of the print object is set for each print position relationally to the pattern; and in the print control process, the processing means determines an attribute set relationally to the print positions specified by the commands as an attribute related to printing each of the print objects.

Thus comprised, when the input print data matches a pattern, attributes of the printing format can be determined for each print object in the print data based on the print position of each print object. As a result, plural objects can be individually processed for more diverse printing.

Example 13

The print control device described above, wherein: the attribute the processing means determines is an attribute specifying one or more of the print color of the print object, the printed size, a print style, a font used in printing, the type of symbol or barcode used in printing, a background color, and a foreground color.

Thus comprised, the print color of a print object, the size an object is printed, the print style, the font used for printing, the type of symbol or barcode used for printing, a background color, and a foreground color can be set for print objects in the input print data. Printing in many different format is therefore possible.

Example 14

The print control device described above, wherein: the pattern is a combination of plural print positions; and the processing means executes the print control process when the print positions of plural print objects specified by the plural commands acquired by the acquisition means match the combination of the pattern.

This aspect of the invention executes a process related to the printing format of the print objects when the combination of print positions of plural print objects contained in the input print data matches a pattern set by the configuration command. As a result, print data to be processed can be identified more accurately by the pattern of print positions.

Example 15

The print control device described above, wherein: the processing means executes the print control process when the print position of a print object including text specified by the command matches the combination of the pattern.

When the input data matches a pattern set by the configuration command, and text is contained in a print object, this aspect of the invention executes a process related to the printing format of the print object. As a result, the print data to be processed can be identified more accurately.

Example 16

A printing device having a print means that prints in plural colors, and printing with more print colors than the number of print colors in the input print data based on input of print data to be printed in one or a plurality of print colors, the printing device comprising: an acquisition means that acquires data denoting a print object contained in the print data, and a command specifying the print position of the print object; a processing means that, based on the print position specified by the command acquired by the acquisition means, executes a print control process including a process that determines an attribute of the print object or a process that replaces the print object with a different print object; and a print control means that prints the print object denoted by the data acquired by the acquisition means at the print position specified by the command by the print means to reflect processing by the processing means.

This aspect of the invention executes a process that determines attributes relating to printing a print object, or replaces a print object with a different print object, based on the print position of the print object. As a result, a process that increases the number of print colors in a print object, or replaces a print object with another print object having more print colors can be executed, and data enabling more colorful printing can be generated. In addition, print data for a print object simply needs to contain a command specifying the print position, and there is no limitation on the data that may be input. Processes such as increasing the number of print colors can therefore be applied to a wide range of input print data for more colorful printing.

Example 17

A printing device having a print means that prints in plural colors, and printing with more print colors than the number of print colors in the input print data based on input of print data to be printed in one or a plurality of print colors, wherein: the print data includes data denoting a print object and a command specifying the print position of the print object; the printing device comprising a configuration means that, when a configuration command that configures processing the print objects printed at each print position relationally to a pattern related to a combination of plural print positions is input, configures the process applied to the pattern and the print objects based on the configuration command; an acquisition means that acquires data denoting the print objects and a command specifying the print positions of the print objects; and a processing means that, when the print positions of the plural print objects specified by plural commands acquired by the acquisition means match the pattern, executes a print control process including a process that determines an attribute related to printing the print object, or a process that replaces the print object with a different print object; and a print control means that prints the print object denoted by the data acquired by the acquisition means at the print position specified by the command by the print means to reflect processing by the processing means.

When the input print data matches a set pattern, this aspect of the invention determines a printing attribute for a print object in the print data or replaces the print object with a different print object. As a result, a process that increases the number of print colors in a print object, or replaces a print object with another print object having more print colors can be executed, and data enabling more colorful printing can be generated. By setting a pattern related to a combination of plural print positions as the condition for executing the process, the print data to process can be selected from print data input for a wide variety of print jobs. A desired print job can therefore be identified using detailed conditions, the defined process applied to only that print job, and more diverse printing is possible. A pattern related to a combination of plural print positions and the process applied to the objects can also be easily set using a configuration command.

Example 18

A printing device having a print means that prints in plural colors, and printing with more print colors than the number of print colors in the input print data based on input of print data to be printed in one or a plurality of print colors, wherein: the print data includes data denoting a print object to be printed and a command specifying the print position of the print object; and a pattern related to a combination of plural print positions is set; the print control device comprising an acquisition means that acquires data denoting the print objects and a command specifying the print positions of the print objects; a processing means that, when the print positions of the plural print objects specified by plural commands acquired by the acquisition means match the pattern, executes a print control process including a process that determines an attribute related to printing the print object, or a process that replaces the print object with a different print object; and a print means that prints the print object denoted by the data acquired by the acquisition means at the print position specified by the command to reflect processing by the processing means.

When the input print data matches a set pattern, this aspect of the invention determines a printing attribute for a print object in the print data or replaces the print object with a different print object. As a result, a process that increases the number of print colors in a print object, or replaces a print object with another print object having more print colors can be executed, and data enabling more colorful printing can be generated. By setting a pattern related to a combination of plural print positions as the condition for executing the process, the print data to process can be selected from print data input for a wide variety of print jobs. A desired print job can therefore be identified using detailed conditions, the defined process applied to only that print job, and more diverse printing is possible.

Example 19

A data processing method that outputs data to be printed in more print colors than the input print data when print data to be printed in one or a plurality of print colors is input, the data processing method comprising: acquiring data denoting a print object contained in the print data, and a command specifying the print position of the print object; and executing a print control process including a process that determines an attribute of the print object or a process that replaces the print object with a different object based on the print position specified by the acquired command.

This aspect of the invention executes a process that determines attributes relating to printing a print object, or replaces a print object with a different print object, based on the print position of the print object. As a result, a process that increases the number of print colors in a print object, or replaces a print object with another print object having more print colors can be executed, and data enabling more colorful printing can be generated. In addition, print data for a print object simply needs to contain a command specifying the print position, and there is no limitation on the data that may be input. Processes such as increasing the number of print colors can therefore be applied to a wide range of input print data for more colorful printing.

Example 20

A data processing method that outputs data to be printed in more print colors than the input print data when print data to be printed in one or a plurality of print colors is input, wherein: when data denoting a print object to be printed and a command specifying the print position of the print object are included in the print data, a pattern related to a combination of plural print positions is set; the data processing method comprising: acquiring data denoting the print objects and a command specifying the print positions of the print objects; and executing a print control process including a process that determines an attribute related to printing the print object, or a process that replaces the print object with another print object, when the print positions of the plural print objects specified by the acquired plural commands match the pattern.

When the input print data matches a set pattern, this aspect of the invention determines a printing attribute for a print object in the print data or replaces the print object with a different print object. As a result, a process that increases the number of print colors in a print object, or replaces a print object with another print object having more print colors can be executed, and data enabling more colorful printing can be generated. By setting a pattern related to a combination of plural print positions as the condition for executing the process, the print data to process can be selected from print data input for a wide variety of print jobs. A desired print job can therefore be identified using detailed conditions, the defined process applied to only that print job, and more diverse printing is possible.

Example 21

A configuration method of a print control device that outputs data to be printed in more print colors than the input print data when print data to be printed in one or a plurality of print colors is input, comprising: when data denoting a print object and a command specifying the print position of the print object are included in the print data, inputting to the print control device a configuration command that configures processing the print objects printed at each print position relationally to a pattern related to a combination of plural print positions; and the print control device acquiring data denoting the print objects and a command specifying the print positions of the print objects; and executing a print control process including a process that determines an attribute related to printing the print object, or a process that replaces the print object with another print object, when the print positions of the plural print objects specified by the acquired plural commands match the pattern.

When the input print data matches a set pattern, this aspect of the invention determines a printing attribute for a print object in the print data or replaces the print object with a different print object. As a result, a process that increases the number of print colors in a print object, or replaces a print object with another print object having more print colors can be executed, and data enabling more colorful printing can be generated. By setting a pattern related to a combination of plural print positions as the condition for executing the process, the print data to process can be selected from print data input for a wide variety of print jobs.

Advantageous Effects of Invention

By processing input print data based on the print positions of print objects, the invention can execute processes such as increasing the number of print colors based on input of various types of print data and achieve colorful printing. Processes related to printing print objects contained in the input print data can also be applied to enable printing in various ways, and a pattern for identifying the print data to process can be easily set by the configuration command. Yet further, processes related to printing print objects in input print data can be applied to print various formats, and the print data to be processed can be identified based on a pattern related to the print positions of plural print objects.

DESCRIPTION OF EMBODIMENTS

A preferred embodiment of the invention is described below with reference to the accompanying figures.

Figure 1:
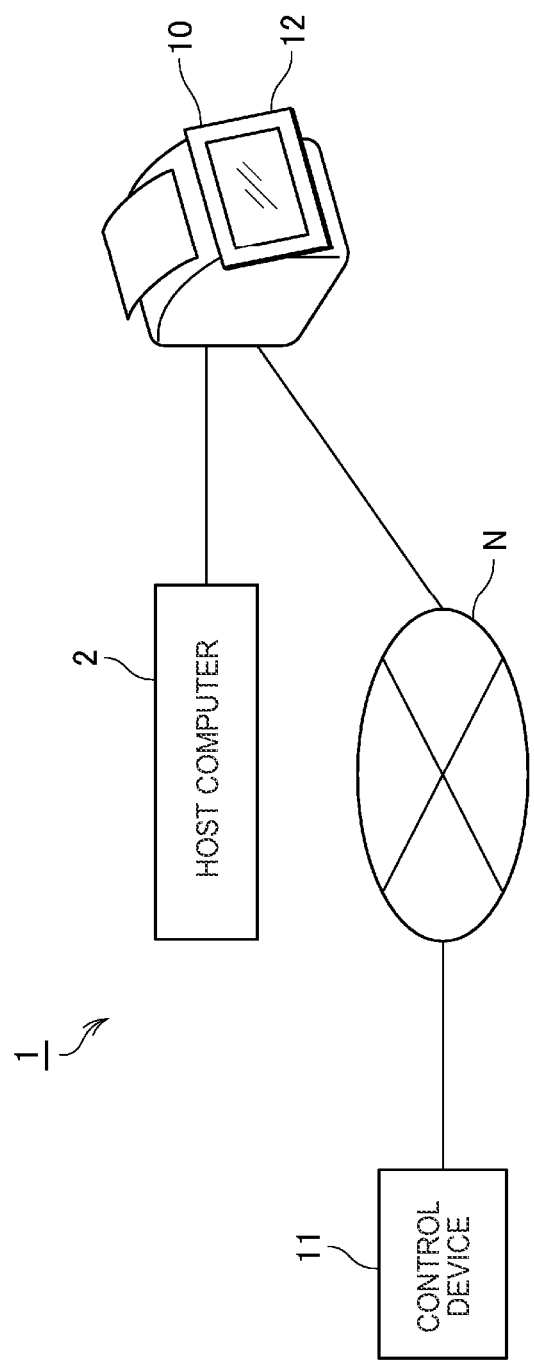
FIG. 1 illustrates a system including a printing device according to an embodiment of the invention.

FIG. 1 illustrates a printing system 1 according to this embodiment of the invention.

The printing system 1 shown in FIG. 1 includes a host computer 2, a printer 10, and a control device 11. The printer 10 is connected to the host computer 2, and prints based on print data output by the host computer 2. A control device 11 can connect to the printer 10 through a network N such as a LAN or the Internet. The number of printers 10 in the printing system 1 is not specifically limited, and multiple printers 10 may connect to the host computer 2 or the network N.

The printer 10 is a printing device with the ability to print on previously loaded print media. The printer 10 according to this embodiment is an inkjet printer that ejects ink onto the printing surface of the print medium. The printer 10 can also print text and images in color using, for example, four colors of ink such as cyan (C), magenta (M), yellow (Y), and black (K) ink. The print medium used by the printer 10 according to this embodiment is label paper having labels with an adhesive coating cut to a specific size affixed to a continuous liner. In this example, the printer 10 prints text and images on individual labels on the liner, producing adhesive labels. By printing the text and images in color, the printer 10 can produce color labels.

The host computer 2 operates as controlled by the operator, and outputs print data to the printer 10. This print data includes commands for operating the printer 10, and data for the text, images, and other print objects the printer 10 prints on the print medium. The commands included in the print data include commands instructing starting to print, line feed commands, and print media conveyance commands, for example. The print data also includes commands specifying where to print the individual print objects and printing attributes for the text, image, and other print objects (print elements). A command specifying the print position includes, for example, coordinates in the printable area of one label printed by the printer 10. The printable area of a label is the area to which ink can be ejected by the printhead (not shown in the figure) of the printer 10 not including margins at the leading and trailing ends in the conveyance direction of the label, and both sides. The printable area is predetermined by parameters such as the size of the label and the scannable area of the printhead (not shown in the figure). The host computer 2 and the printer 10 store information related to the size of the printable area of the labels in the printer 10. The coordinates indicating the print position are coordinates in a coordinate system with an origin on one side of the leading end of the printable area of the label, for example. Examples of data related to an object to be printed include text data identifying the characters to print and image data about the images to print. Attributes about the printing format of objects to print include, for example, the character size, font, whether there is and the type of any styling (fold, italic, underline, for example), and the print color used to print the object. Commands specifying attributes of the printing format can be used by the host computer 2 and the printer 10. For example, to print text in a specific color, ASCII codes or text data, which is the object data, and a command specifying the print color of the object, are sent to the printer 10.

The host computer 2 and printer 10 are connected by wire using a USB cable, RS-232C cable, or IEEE 1284 cable, for example. The host computer 2 and printer 10 may also connect through a wireless communication connection such as a wireless LAN or a Bluetooth (T) connection.

The control device 11 is a device that can run a web browser, and the type of device that can operate as the control device 11 is not specifically limited. For example, a notebook computer (personal computer), a desktop computer, a tablet computer, a cell phone, or a PDA can be used as the control device 11.

Figure 2:
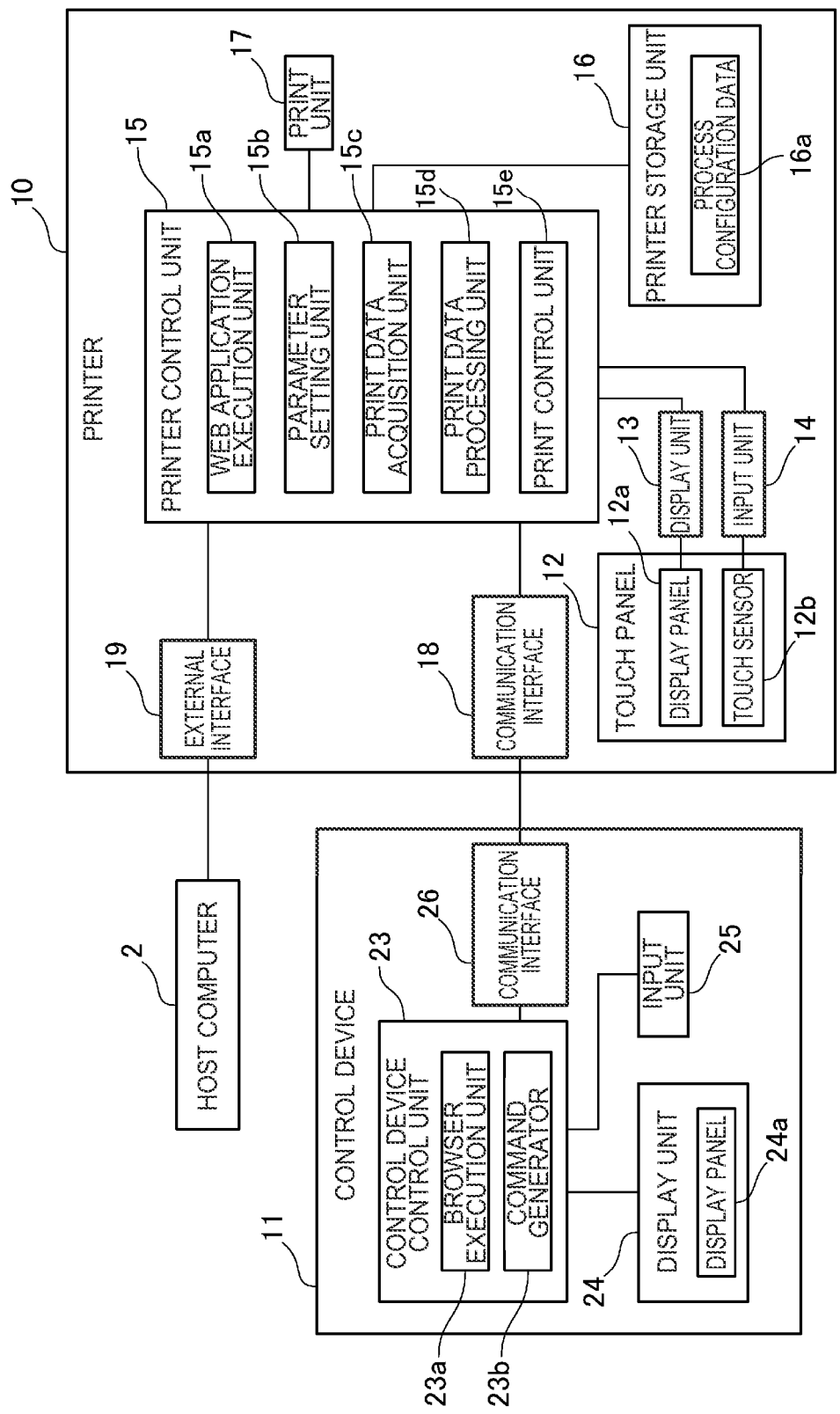
FIG. 2 illustrates the functional configuration of a control device and printer.

FIG. 2 is a block diagram illustrating the functional configuration of the printer 10 and control device 11, also showing the host computer 2 for convenience of description.

The printer 10 includes a touch panel 12, display unit 13, input unit 14, printer control unit 15 (print control device), printer storage unit 16, print unit 17 (printing means), communication interface (interface) 18, and external interface 19.

The touch panel 12 is disposed to the front panel of the printer 10 as shown in FIG. 1, and includes a display panel 12a for displaying various screens, and a touch sensor 12b that detects touch operations by the operator. The display panel 12a is driven by the display unit 13, and displays setup screens containing an image of the print object the printer 10 is to print and various configuration settings. The touch sensor 12b is a sensor film disposed over the display panel 12a. The touch sensor 12b may be a pressure sensitive or capacitive sensor, and detects touch or pressure from user operations using a finger or stylus. The operator can input settings to the printer 10 by touching the display panel 12a while viewing content displayed on the display panel 12a.

The printer control unit 15 includes a CPU, ROM, RAM, and other peripheral circuits, and centrally controls other parts of the printer 10. The printer control unit 15 includes function blocks such as a web application execution unit 15a, parameter setting unit 15b, print data acquisition unit 15c, print data processing unit 15d, and print control unit 15e. These function blocks are described further below.

The display unit 13 drives the display panel 12a as controlled by the printer control unit 15, and displays the setup screens and other windows described below on the display panel 12a. When the touch sensor 12b detects an operation, the input unit 14 outputs operation data including the detected position of the operation to the printer control unit 15.

The printer storage unit 16 includes EEPROM or other nonvolatile memory, and nonvolatilely rewritably stores programs and data. The printer storage unit 16 stores process configuration data 16a related to print objects the printer 10 prints. The process configuration data 16a is described further below.

The print unit 17 includes a conveyance mechanism for conveying the print media loaded in the printer 10, a printhead with nozzles for ejecting ink for each color of ink, and a drive mechanism for driving the printhead. The print unit 17 prints in color on the print medium as controlled by the printer control unit 15.

The communication interface 18 and external interface 19 communicate with external devices according to a specific communication protocol as controlled by the printer control unit 15. In this embodiment of the invention, the communication interface 18 is connected to the network N, and handles data communication with the control device 11 according to a specific communication protocol. The external interface 19 exchanges data with the host computer 2 using the USB protocol, for example.

The control device 11 includes a control device control unit 23, a display unit 24, an input unit 25, and a communication interface 26.

The control device control unit 23 includes a CPU, ROM, RAM, and other peripheral circuits, and central controls other parts of the control device 11. The control device control unit 23 includes a browser execution unit 23a and a command generator 23b. These function blocks are described further below.

The display unit 24 has a liquid crystal display panel or other type of display panel 24a, and displays setup screens and other windows on the display panel 24a as controlled by the control device control unit 23. The input unit 25 connects to input devices such as a mouse, keyboard, touch panel, and operating keys. The input unit 25 detects input to a connected input device, and outputs operation data according to the input content to the control device control unit 23.

A specific web browser is installed on the control device 11. The browser execution unit 23a of the control device control unit 23 of the control device 11 is a function block embodied by functions of the web browser. More specifically, the functions of the browser execution unit 23a are rendered by the cooperation of hardware and software, such as a CPU executing the web browser and related programs.

A web application is installed on the printer 10. The web application execution unit 15a of the printer control unit 15 of the printer 10 is a function block embodied by functions of the web application. More specifically, the functions of the web application execution unit 15a are rendered by the cooperation of hardware and software, such as a CPU executing the web application and related programs.

The printer 10 receives print data sent from the host computer 2, and prints labels according to the print data. The printer 10 in this embodiment can modify content of the print data received from the host computer 2 to print labels. For example, if the host computer 2 sends print data for monochrome printing, the printer 10 can print in color and produce a color label based on the print data for monochrome printing. More specifically, the printer 10 can print color labels when connected to the host computer 2 in a configuration in which the host computer 2 sends print data for monochrome printing of labels. In this event, there is no need to change either the function whereby the host computer 2 sends print data or the print data the host computer 2 sends. The content of processes the printer 10 applies to print data received from the host computer 2 and conditions for executing processes can be set by operating the control device 11 or the printer 10 itself.

The touch panel 12 and touch sensor 12b are used when configuring settings by operating the printer 10 itself. There are two methods for configuring settings with the control device 11. One method uses functions of the browser execution unit 23a and the web application execution unit 15a. The other method sends configuration commands from the control device 11 to the printer 10.

When operating the printer 10 to configure settings, a configuration screen is presented on the display panel 12a by control of the printer control unit 15. In this event, the operator uses the touch sensor 12b to perform operations on the configuration screen.

For example, a configuration screen including an image of the object for monochrome printing is presented on the display panel 12a. The operator specifies where to add color in the image of the printout and specifies the print color by touch operations. The conditions for applying the specified print color are also input by touch operations. The printer control unit 15 relationally stores the conditions, print colors, and positions where to apply the print colors input by touch operations as process configuration data 16a in the printer storage unit 16. The process configuration data 16a is stored as a unit of print data received from the host computer 2 (called a print job). For example, process configuration data 16a is stored for one label the printer 10 prints.

Figure 3:
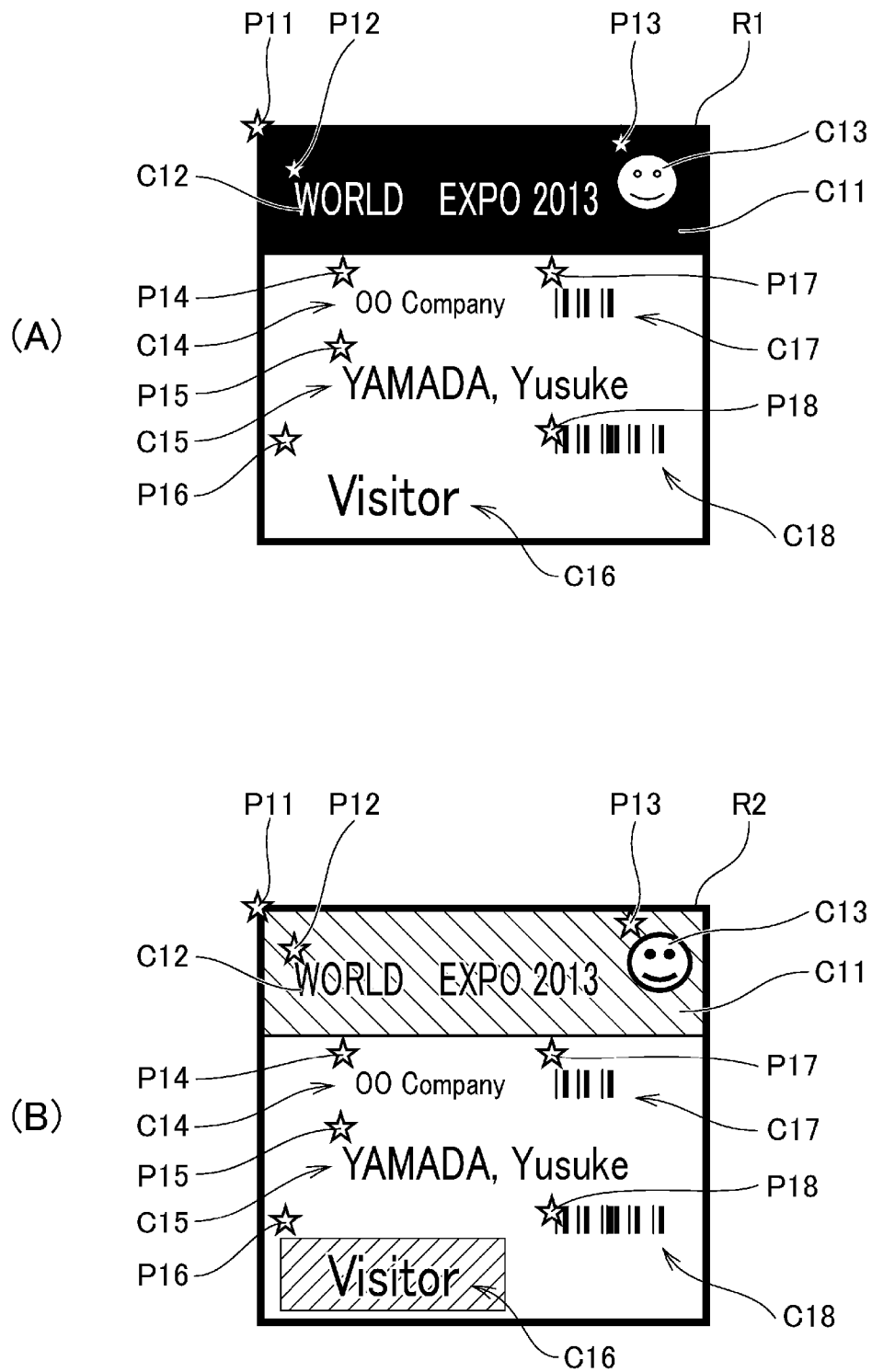
FIG. 3 illustrates an example of a process applied to print data by the printer.

FIG. 3 illustrates a process the printer 10 applies to print data. FIG. 3 (A) shows an image of a label printed by the print data sent by the host computer 2, and (B) shows an image of a label based on the print data processed by the printer 10.

The label image R1 shown in FIG. 3 (A) has plural text, image, and barcode objects on a single label. A title block C11 placed at the top of the label image R1 is printed solid black with white text C12 and image blocks C13 in the title block C11. Monochrome (black in this example) text blocks C14, C15, C16 and barcode blocks C17, C18 are printed in the middle and bottom parts of the label. Label image R1 is an image of a label printed based on print data output by the host computer 2. The print data includes the text data in text blocks C12, C14, C15, C16, image data for image C13, and the data for barcodes C17, C18. The barcodes C17, C18 are printed with a barcode font, for example.

The print data the host computer 2 sends also includes coordinate data indicating where each object is printed. The print position indicated by the coordinates is the top left corner of each printed object. The print data for label image R1 also includes the coordinates P11 of the top left corner of the title block C11. The star shown in FIG. 3 (A) is a symbol shown superimposed on the print image so that the location of the print position indicated by the coordinates P11 is easy to know. The print data for label image R1 similarly includes the coordinates P12 to P18 for the print positions of the text C12, C14 to C16, image C13, and barcode C17, C18 objects. The coordinates P11 to P18 are included in the print data relationally to the corresponding objects.

The printer 10 acquires the print data sent by the host computer 2 through the print data acquisition unit 15c (acquisition means) when setting up the printing process. Next, the parameter setting unit 15b (configuration means) creates and displays the label image R1 based on the print position coordinates and object data in the print data acquired by the print data acquisition unit 15c on the display panel 12a.

Based on the label image R1 displayed on the display panel 12a, the operator selects an object to process by touching the object. For example, to change the color for printing the title block C11, the operator touches the star of the coordinates P11 indicating the print position of the title block C11. The operator then selects the print color of the title block C11. Selecting the color can be done by, for example, the parameter setting unit 15b displaying a dialog box or color palette for selecting the color. Print colors that can be set include, for example, the background color, foreground color, and text color. The print color may also be set to a randomly selected color.

The title block C11 is selected as the object to process and the print color is specified by this operation. The same operation is used to set the print color for one or plural objects displayed in the label image R1. When an operation indicating that setting the print colors in the label image R1 is completed is detected, the parameter setting unit 15b relationally stores the specified print colors and the processed objects temporarily in RAM, for example. Data indicating the process content, such as "print the object at print position coordinates P11 blue", is created and stored by the parameter setting unit 15b.

If coordinates P16 of text object C16 are selected in the label image R1 and the background color is set to yellow, data indicating the print position coordinates P16, "background color" as the type of color setting, and yellow as the set print color is created by the parameter setting unit 15b.

When the printer 10 executes the specified process and color attributes are added to the print data, a label image R2 such as shown in FIG. 3 (B) is printed based on the processed print data. Label image R2 in FIG. 3 (B) is an image of the label printed with the applied changes. The print color of the title block C11 printed at coordinates P11 was black in label image R1, but the print color is blue in label image R2. The text block C16 printed at coordinates P16 is also printed with a background color added. The printer 10 can therefore print a color label even though the print data sent by the host computer 2 is data for monochrome printing using only black ink.

The process applied to the printed objects is also not limited to adding attributes related to the print color, including specifying the background color, specifying the foreground color, and specifying the print color of the objects themselves. For example, a process that replaces image data contained in the print data as a print object with other image data could be specified. By changing monochrome image data to color image data, a color label can be printed based on print data for printing a monochrome label, and an attribute related to the print color is added as a result. For example, replacing an image can also be specified by including in the process configuration data 16a the print position (such as coordinates) of an object and information (such as a file name) specifying the image data substituted for the original image data. Another condition may be that image data is contained as the object at the specified print position. Further alternatively, replacing image data contained in the print data without specifying the print position may also be specified.

When information specifying replacing image data is included in the process configuration data 16a, the printer 10 replaces the image data contained in the print data received from the host computer 2 and prints the label based on the print data after the substitution.

The printer 10 can also be operated to set conditions for identifying print data to which to apply the process. If the process to "print the object at print position coordinates P11 blue" is applied to all print data, all corresponding objects will be printed blue. This is not a problem if the printing system 1 prints only one type of label. However, if the printer 10 prints many different types of labels, labels formatted differently from label image R1 will also be printed with the print colors set for label image R1. The same is true when the print color is specified for print positions P12 to 18.

The printer 10 therefore applies the process as configured when the print data received from the host computer 2 meets the specified condition. This condition can be set for each process configured based on label image R1, that is, for each label.

The conditions may be set in the following three ways, for example.

1. The print positions of plural objects in the print data match a set pattern.
2. An object of specific content is contained in the print data.
3. An object of content set according to a specified print position is included in the print data.

In the first method, the condition is that the print positions of the plural objects contained in the print data match a specific pattern. For example, the print data for label image R1 shown in FIG. 3 (A) contains eight coordinates P11 to P18 as the print positions of the objects. The group of eight coordinates P11 to P18 can be set as a pattern used as the pattern for applying the process. In this example, the printer 10 prints the print data using the set print colors when print data including all eight coordinate sets P11 to P18 is sent from the host computer 2. Further alternatively, there being a pattern comprising the print positions of all objects in the print data may be set as the condition, and there being a pattern comprising the print positions of a subset of objects may be set as the condition. Further alternatively, a process may be applied to only print data including all print positions (coordinates) forming a pattern, or a process may be applied to print data including some print positions.

For example, a combination of the four coordinates P11 to P14 selected from the coordinates P11 to P18 in label image R1 may be set as the pattern condition. In this event, the print data may be processed if the print data received from the host computer 2 includes the three coordinates P11 to P13. The print data may also be processed if the print data received from the host computer 2 contains all coordinates P11 to P14 and also includes other coordinates.

In other words, in a first configuration method, the percentage of coordinates forming the pattern of the condition being contained in the received print data equalling or exceeding a specific value (such as 75%) may be set as a condition for applying a process. Alternatively, in a second configuration method, the coordinates forming the pattern of the condition equalling or exceeding a specific percentage (such as 75%) of the coordinates in the received print data may be set as a condition for applying a process.

The first configuration method is generally preferable as a method of easing the conditions for selecting process targets. The second configuration method is preferable when there are few coordinates in the pattern of the condition, and for processing print data to which an object was added.

In the second method, the content of the objects contained in the print data is the condition. For example, there are eight blocks C11 to C18 in the print data of the label image R1 in FIG. 3 (A). The condition may be that some or all of the objects are contained in the print data. More specifically, the condition could be that the text object Visitor is included in the print data. To ease the condition in this event, the process may be applied to print data including other text of which part is the text Visitor. Further alternatively, the process may be applied to print data including the text Visitor and some other object. The content of this other object being an image or a barcode may be a condition, and the file name may be a condition in the event of an image object.

In the third method above, the content of an object contained in the print data and the print position of the object are the condition. For example, there are eight blocks C11 to C18 in the print data of the label image R1 in FIG. 3 (A). The condition may be that some or that all of the objects are included in the print data. In this event, the condition is that each content object is included and that print position of each object matches the specified coordinates. More specifically, that the text object Visitor at coordinates P16 is included can be set as the condition. To ease the condition in this event, the process may be applied to print data including other text of which part is the text Visitor. Further alternatively, the process may be applied to print data including the text Visitor and some other object. The print position may also be set as a range instead of by coordinates. The content of an object may also be an image or barcode, and the file name may be a condition in the event of an image object.

These conditions may be input, or the type of condition may be preset, when the print position or object and print color are set by using the touch sensor 12b. The parameter setting unit 15b relationally stores the correlation between the specified print position or object and print color, and the conditions for applying the process to print data, as process configuration data 16a.

Once process content for colorizing print data is input and the process configuration data 16a is stored, the printer 10 can process print data.

As described above, selecting objects and print colors, and setting conditions, can be done using functions of the browser execution unit 23a of the control device 11. In this event, the browser execution unit 23a accesses the web application execution unit 15a of the printer control unit 15 based on operation of the input unit 25, and requests data for a configuration web page. The web application execution unit 15a then generates and sends the configuration web page data to the control device 11. A script that calls a program executed by the web application execution unit 15a can be included in the configuration web page.

Based on the configuration web page data sent from the web application execution unit 15a, the browser execution unit 23a displays a configuration screen on the display panel 24a. A label image R1 such as shown in FIG. 3 (A) is shown in this configuration screen. When the objects to be processed and the print colors are set by input through the input unit 25 based on this configuration screen, the browser execution unit 23a sends the specified content to the web application execution unit 15a. The web application execution unit 15a then acquires and temporarily stores the specified content by a function of the parameter setting unit 15b. The function of the parameter setting unit 15b is the same as when settings are made through the printer 10. When conditions are set by operating the input unit 25, the browser execution unit 23a sends data indicating the set conditions to the web application execution unit 15a. The web application execution unit 15a then acquires the conditions sent from the control device 11, and the parameter setting unit 15b generates process configuration data 16a based on the acquired conditions.

These settings can also be made by sending configuration commands from the control device 11 to the printer 10.

The control device 11 has a command generator 23b. The command generator 23b generates configuration commands for setting up the printer 10. When a configuration command is received from the control device 11, the parameter setting unit 15b generates and stores process configuration data 16a in the printer storage unit 16 based on the content of the received configuration command.

A configuration command may include a condition parameter and a process content parameter.

The condition parameter describes conditions determining what print data the process is applied to.

The process content parameter describes conditions determining what objects to process, and the content of the process to apply to those objects. Object conditions can be specified by, for example, the print position, object type, or content. The object type refers to whether the object is text data or image data, for example. The object content may be, for example, the file name of image data, the size (such as resolution or pixel count) of the image data, characters contained in text data, text data style or font information, or other printing attributes. The content of the process applied to an object may include a background color, foreground color, the print color of the object, or image data substitution, for example, as described above.

An example of a configuration command is described below.

[Configuration command S]
(start)
(start add color condition)
coordinates 0,0
(end add color condition)
(foreground color) blue
(end add color)
(start add color condition)
coordinates 42, 33
(end add color condition)
(foreground color) white
(start add color condition)
coordinates 37, 241
(end add color condition)
(background color) light blue
(end add color)
(end)

In this example, (start) and (end) indicate the beginning and end of the configuration command; (start add color condition) and (end add color condition) are commands specifying the conditions of the objects to process for adding color, and accompany coordinates or other data as a condition; and (foreground color) is a command specifying the foreground color of the object, and accompanies data indicating the specified color.

The configuration command S in this example does not include the condition parameter. A process specifying blue as the foreground color for the object with the print position coordinates 0, 0, a process setting white as the foreground color of the object with the coordinates 42,33, and a process setting light blue as the background color of the object at coordinates 37,241 are included in the process content parameter.

An example of print data sent by the host computer 2 is described next. Print data T shown for example below is data for printing the label image R1 shown in FIG. 3 (A).

[print data T]
(coordinates) 0, 0 (rectangle) 500×90 (delimiter)
(coordinates) 42, 33 (font) Arial20 (text) WORLD EXPO 2013 (delimiter)
(coordinates) 415, 29 (image) FACE.PNG (delimiter)
(coordinates) 95, 115 (font) Arial10 (text) 00 Company (delimiter)
(coordinates) 325, 115 (identifier) 12345 (delimiter)
(coordinates) 93, 165 (font) Arial20 (text) YAMADA, Yusuke (delimiter)
(coordinates) 325, 227 (identifier) 856321354 (delimiter)
(coordinates) 37, 241 (font) Arial25 (text) Visitor (delimiter)

In this example, (coordinates) is a command specifying the coordinates; (rectangle) is a command specifying drawing a rectangle; (font) is a command specifying the font and font size; (text) is a command specifying printing text and includes the text to print; (identifier) is a command specifying printing a barcode and includes the barcode data; and (delimiter) is a command marker delimiting commands.

The following objects are printed based on this print data T.

A rectangle 500 dots wide by 90 dots high drawn at coordinates 0,0

The text "WORLD EXPO 2013" is printed at coordinates 42, 33. The font is Arial, and the character size is 20.

The image data from the file FACE.png is printed at coordinates 415, 29.

The text "00 Company" is printed at coordinates 95, 115. The font is Arial, and the character size is 10.

The string "12345" is printed as a barcode at coordinates 325, 115.

The text "YAMADA, Yusuke" is printed at coordinates 93, 165. The font is Arial, and the character size is 20.

The string "856321354" is printed as a barcode at coordinates 325, 227.

The text "Visitor" is printed at coordinates 37, 241. The font is Arial, and the character size is 25.

When print data T is processed according to the process configuration data 16a generated based on the configuration command S, print data U shown below is generated. This print data U is the result of the printer 10 converting print data T.

[print data U]
(start)
(coordinates) 0, 0 (rectangle) 500×90 (foreground color) blue (delimiter)
(coordinates) 42, 33 (font) Arial20 (text) WORLD EXPO 2013 (foreground color) white (delimiter)
(coordinates) 415, 29 (image) FACE.PNG (delimiter)
(coordinates) 95, 115 (font) Arial10 (text) 00 Company (delimiter)
(coordinates) 325, 115 (identifier) 12345 (delimiter)
(coordinates) 93, 165 (font) Arial20 (text) YAMADA, Yusuke (delimiter)
(coordinates) 325, 227 (identifier) 856321354 (delimiter)
(coordinates) 37, 241 (font) Arial25 (text) Visitor (background color) light blue (delimiter)
(end)

A label printed by the printer 10 using this print data U appears as label image R2 shown in FIG. 3 (B). The rectangle at coordinates 0,0 in label image R1 is printed blue, the text string WORLD EXPO 2013 at coordinates 42,33 is printed white, and the text string Visitor at coordinates 37,241 is printed with a light blue background.

The printer 10 can process all print data received from the host computer 2 in the same way using the process configuration data 16a generated based on the configuration command S. More specifically, the printer 10 processes print data with objects at coordinates 0, 0, coordinates 42, 33, and coordinates 37, 241 and sets the print color, foreground color, and background color of the objects at those positions.

Note that the actual configuration commands and commands shown in parentheses ( ) in the print data are defined and written in single byte alphanumeric characters, for example.

By identifying the print data to process based on the content of an object, the print color can be changed according to the characters in a text object, for example.

Figure 4:
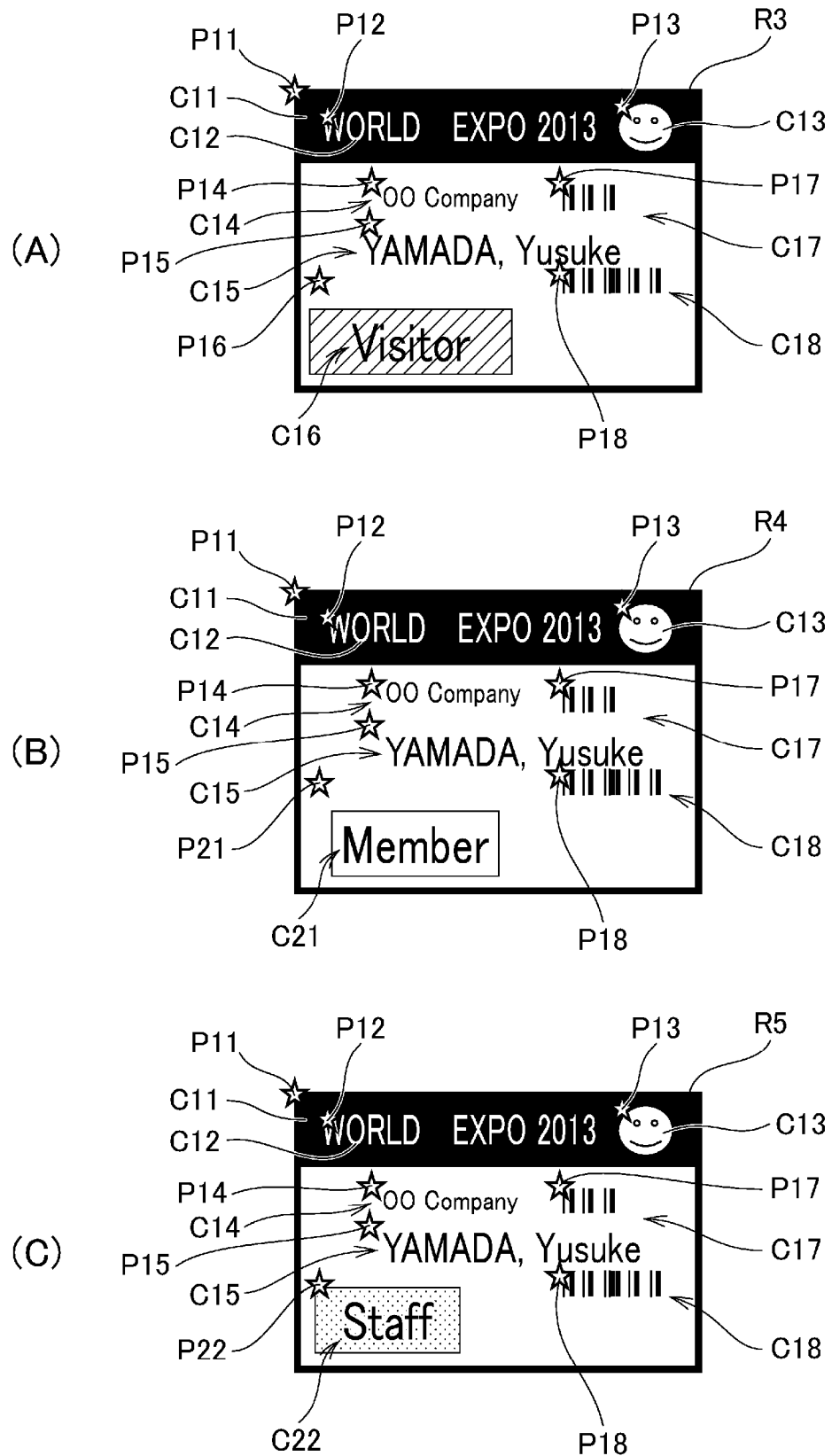
FIG. 4 illustrates another example of a process applied to print data by the printer.

FIG. 4 illustrates another example of a process the printer 10 applies to print data. FIG. 4 (A) to (C) show images of labels based on print data processed by the printer 10.

The label image R3 shown in FIG. 4 (A) is an example of a label printed by applying a process that changes the print color of text block C16 and sets the background color in the print data of the label image R1 shown in FIG. 3 (A). The label image R4 in FIG. 4 (B) has a text block C21 containing a different string than the print data for label image R1 at coordinates P21. The label image R5 in FIG. 4 (C) has a text block C22 containing a different string than the print data for label image R1 at coordinates P22.

This example illustrates changing the print color and background color when the string in text block C16 is Visitor, when the string in text block C16 is Member, and when the string is Staff. In this example, the condition of the print data to process and the process content are set relationally, and the process is defined to make the color of the printed text blue and the background color light blue when the print data contains the string Visitor. Likewise, the color of the printed text is made red and the background color is made light red when the print data contains the string Member, and the color of the printed text is made green and the background color is made yellow when the print data contains the string Staff. These settings can be made by generating process configuration data 16a for each string condition, or the process configuration data 16a may be generated to contain plural conditions and process content for each condition.

Figure 5:
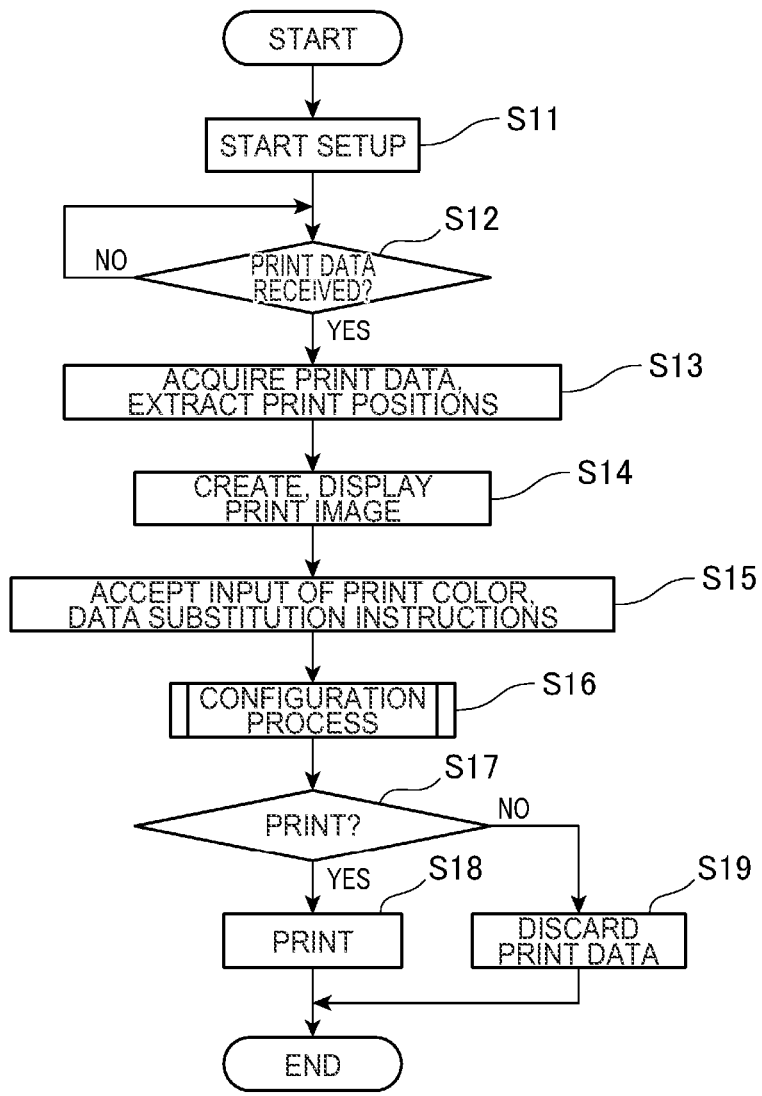
FIG. 5 is a flow chart describing the operation of the printer.
Figure 6:
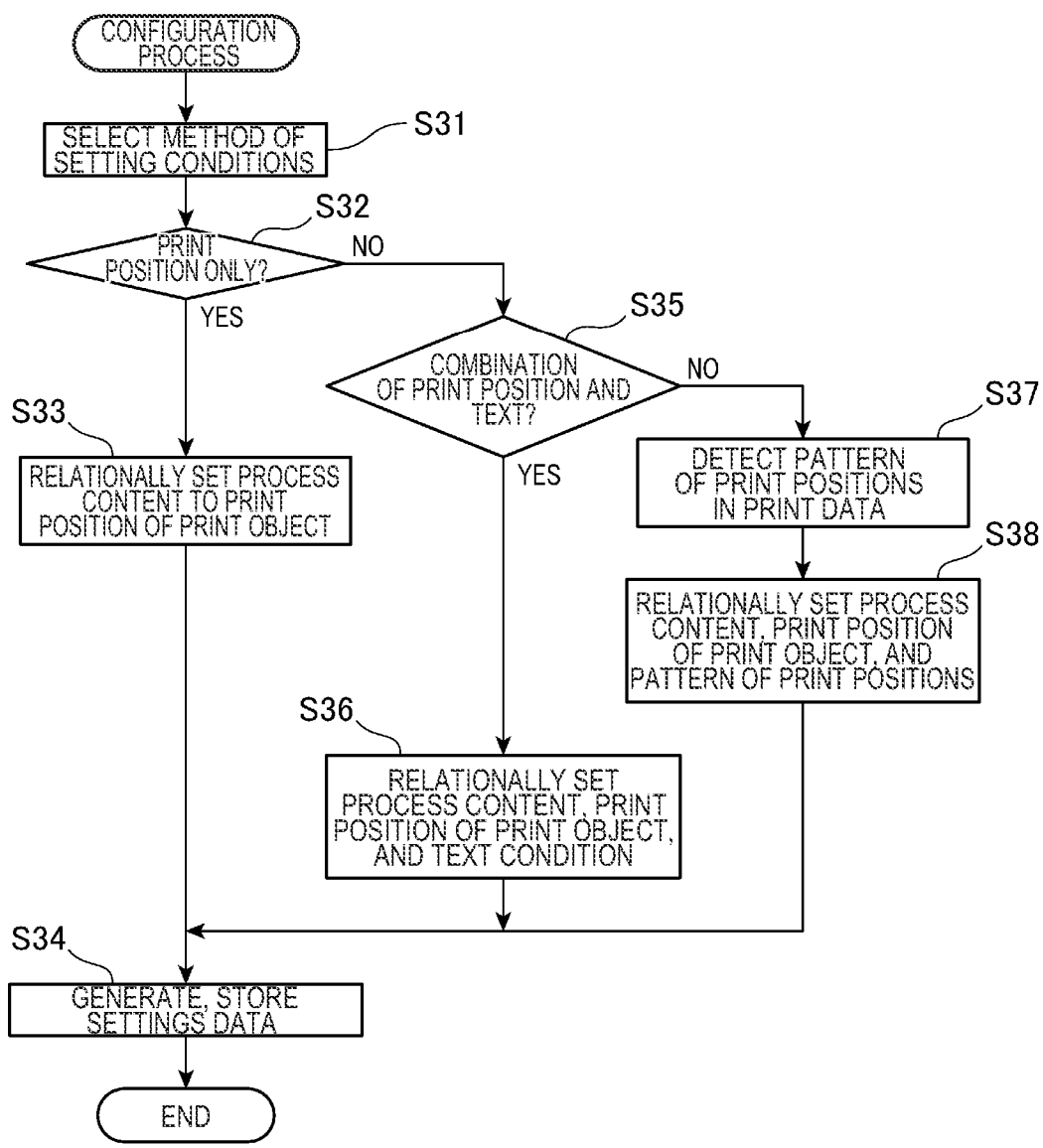
FIG. 6 is a flow chart describing the operation of the printer.
Figure 7:
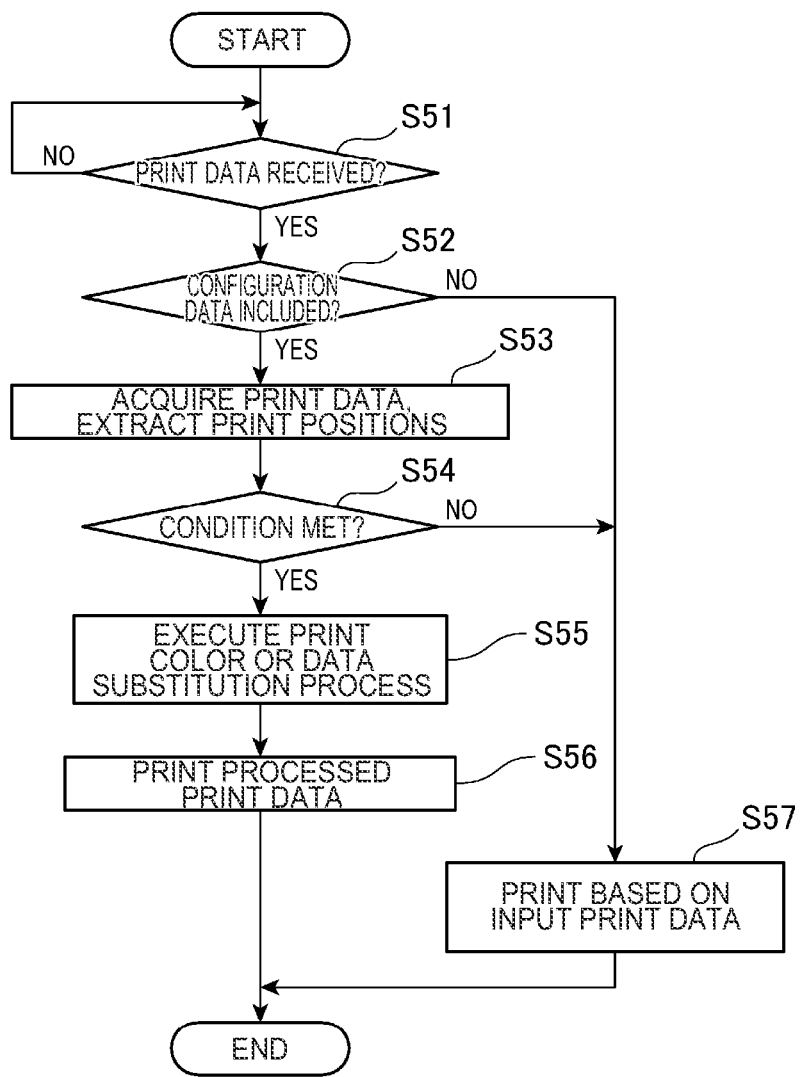
FIG. 7 is a flow chart describing the operation of the printer.

FIG. 5 to FIG. 7 are flow charts describing the operation of the printer 10. FIG. 5 describes the configuration operation on the printer 10, and particularly shows an example of inputting settings by operating the touch panel 12. FIG. 6 describes the setup process executed in step S16 in FIG. 5 in detail. FIG. 7 describes operation of the printer 10 when print data is received from the host computer 2.

In the process in FIG. 5, when the touch sensor 12b is operated to start the configuration process (step S11), the print data acquisition unit 15c waits until print data is received through the external interface 19 (step S12). When print data is received (step S12 returns YES), the print data acquisition unit 15c acquires the received print data and the print data acquisition unit 15c extracts the print positions (such as the coordinates) of the objects (step S13).

The parameter setting unit 15b generates and displays a print image based on the print data the print data acquisition unit 15c acquired on the display panel 12a (step S14). The print image displayed in this example is the label image R1 shown in FIG. 3 (A), for example.

The parameter setting unit 15b detects operation of the touch sensor 12b, and accepts input related to selecting the objects to process, print color settings, and substitution of image data (step S15). The parameter setting unit 15b then executes the configuration process that generates the process configuration data 16*a* based on the input content (step S16). The configuration process is described further below with reference to FIG. 6.

After the configuration process, the parameter setting unit 15*b* determines whether or not to print a label processed based on the process configuration data 16*a* generated in the configuration process (step S17). The decision in step S17 is made according to a previous setting controlling whether or not to print, or a selection input through the touch sensor 12*b*. If the decision is to print (step S17 returns YES), the print data processing unit 15*d* (processing means) processes the print data received in step S12 based on the process configuration data 16*a* generated in step S16. The print control unit 15*e* (print control means) then controls the print unit 17 to print based on the processed print data (step S18), and the process then ends.

However, if the decision is to not print (step S17 returns NO), the print data processing unit 15*d* discards the print data received in step S12 (step S19), and the process ends. Note that before discarding the print data in step S19, the print data processing unit 15*d* may process the print data received in step S12 and display a print image based on the processed print data on the display panel 12*a*. In this event, the label image R2 shown in FIG. 3 (B) is displayed, and the operator can verify the content of the settings.

Conditions identifying the print data to process are selected in the configuration process shown in FIG. 6. The method of setting the print data conditions is selected first using the touch sensor 12*b* (step S31). The parameter setting unit 15*b* then determines if the selected condition is only the print position of the target object (step S32). If the selected condition is only the print position of the target object (step S32), the parameter setting unit 15*b* correlates the process content and the object selected using the touch sensor 12*b* (step S33). Next, the parameter setting unit 15*b* generates and stores process configuration data 16*a* reflecting the settings in the printer storage unit 16 (step S34).

If the condition selected in step S31 is not only the print position of the target object (step S32 returns NO), the parameter setting unit 15*b* determines if the selected condition is a combination of the print position of the target object and text (step S35). If the selected condition is a combination of the print position of the target object and text (step S35 returns YES), the parameter setting unit 15*b* correlates the object selected using the touch sensor 12*b*, the process content and the text (string) (step S36). Next, the parameter setting unit 15*b* goes to step S34, and generates and stores the process configuration data 16*a* in the printer storage unit 16.

If the condition selected in step S31 is not a combination of text and the print position of the target object (step S35 returns NO), the parameter setting unit 15*b* executes a process using a pattern of print positions as the selected condition. The parameter setting unit 15*b* detects the pattern of print positions in the print data received in step S12 (FIG. 5) (step S37). Next, the parameter setting unit 15*b* correlates the detected pattern to the process content and the object selected using the touch sensor 12*b* (step S38) and goes to step S34.

Note that when settings are made by functions of the browser execution unit 23*a* of the control device 11 in the process shown in FIG. 5 and FIG. 6, input is done through the browser execution unit 23*a* instead of using the touch sensor 12*b*. The content displayed on the display panel 12*a* is also displayed on the display panel 24*a* of the control device 11.

When settings are made by configuration commands generated by the command generator 23*b*, the parameter setting unit 15*b* generates and stores process configuration data 16*a* according to the configuration commands received through the communication interface 18.

As shown in FIG. 7, the printer 10 waits during normal operation until print data is received from the host computer 2 (step S51). When the host computer 2 receives print data, the print data acquisition unit 15*c* receives the print data through the external interface 19 (step S51 returns YES). The print data processing unit 15*d* then determines if there is process configuration data 16*a* in the printer storage unit 16 (step S52). If process configuration data 16*a* is stored (step S52 returns YES), the print data processing unit 15*d* acquires the process configuration data 16*a* and extracts the print positions in the received print data (step S53).

The print data processing unit 15*d* then determines if the print positions in the received print data meet the conditions in the process configuration data 16*a* (step S54). If the conditions are matched (step S54 returns YES), the print data processing unit 15*d* processes the print data according to the process configuration data 16*a* (step S55). Next, the print control unit 15*e* prints based on the processed print data (step S56).

If process configuration data 16*a* is not stored (step S52; No), and if the print data does not meet the conditions in the process configuration data 16*a* (step S54), the print control unit 15*e* prints based on the received print data (step S57).

The effect of this embodiment of the invention is described next.

(1) With this embodiment of the invention as described above, the printer 10 has a printer control unit 15 that outputs data to be printed with more colors than the input print data when print data to be printed in one or multiple colors is input. The printer control unit 15 includes a print data acquisition unit 15*c*, print data processing unit 15*d*, and print control unit 15*e*. The print data acquisition unit 15*c* acquires data indicating print object contained in the input print data, and a command specifying the print positions of the print objects. Based on the print positions specified by the commands acquired by the print data acquisition unit 15*c*, the print data processing unit 15*d* executes a process that determines the object attributes or a process that replaces an object with a different object. The print control unit 15*e* then prints the objects indicated by the data acquired by the print data acquisition unit 15*c* at the print positions specified by the commands with the print unit 17 to reflect processing by the print data processing unit 15*d*.

As a result, a process that determines the attributes related to printing an object, or replacing an object with another object, based on the print position of the object can be executed. As a result, processes that increase the number of colors for printing objects or replace an object with a different object with more colors can be executed, and data enabling more colorful printing can be generated. In addition, print data for a target object simply needs to contain a command specifying the print position, and there is no limitation on the print data that may be input. Processes such as increasing the number of print colors can therefore be applied to a wide range of input print data for more colorful printing.

(2) The content of a process the print data processing unit 15*d* applies to a print object is related to the print position of the object and set in process configuration data 16*a* in the printer 10. The print data processing unit 15*d* processes an object according to the content set relationally to the print position of the object in the process configuration data 16a. As a result, objects can be processed quickly based on the input print data.

(3) The print data processing unit 15d changes the print color of an object to the color set in the process configuration data 16a according to the print position specified by the command acquired by the print data acquisition unit 15c. As a result, a different print color can be assigned to an object set for monochrome printing. In addition, different print colors can be assigned to multiple objects at different print positions. Data for more colorful printing can therefore be output.

(4) The print data processing unit 15d determines the print color of an object based on the print position set by a command acquired by the print data acquisition unit 15c and the object content. As a result, a different print color is assigned based on the content for objects printed at the same print position. Data for more colorful printing can therefore be output.

(5) The command included in the print data is a command specifying the print position of an object on the page for printouts printed by page unit. Because there are no limits on the print data to be processed, processes such as increasing the number of print colors can be applied to a wide range print data to enable more colorful printing.

(6) When print data to be printed in one or multiple colors is input, the printer control unit 15 of the printer 10 in this embodiment of the invention outputs data to be printed with more colors than in the input print data. The printer control unit 15 includes a parameter setting unit 15b, print data acquisition unit 15c, print data processing unit 15d, and print control unit 15e. When a configuration command that correlates a pattern related to a combination of plural print positions to a process applied to the objects printed at the print positions is input, the parameter setting unit 15b determines how to process the pattern and objects according to the configuration command. The print data acquisition unit 15c acquires data about the objects to print and a command specifying the print positions of the objects. When the print positions of the plural objects specified by the plural commands acquired by the print data acquisition unit 15c match the pattern, the print data processing unit 15d executes processes such as a process that determines the attributes related to printing the objects and a process that replaces an object with another object. The print control unit 15e then prints the objects indicated by the data acquired by the print data acquisition unit 15c at the print positions specified by the commands with the print unit 17.

As a result, a process that increases the number of colors used to print objects, or replaces an object with another object with more colors can be executed, and data enabling more colorful printing can be generated. By setting a pattern related to a combination of plural print positions as the condition for executing the process, the input data to be processed can be selected from a variety of print jobs. A desired print job can therefore be identified using detailed conditions, the defined process applied to only that print job, and more diverse printing is possible. A pattern related to a combination of plural print positions and the process applied to the objects can also be easily set using a configuration command.

(7) The parameter setting unit 15b correlates a pattern based on a configuration command with attributes related to the printing format of the objects printed at the print positions. The print data processing unit 15d executes a process that determines the attributes set relationally to a print position set by a command as attributes related to printing individual objects. As a result, plural objects can be processed individually for more diverse printing.

(8) The attributes determined by the print data processing unit 15d are attributes specifying at least one of the print color of an object, the printed size, a print style, a font used for printing, the type of symbol or barcode used for printing, a background color, and a foreground color. As a result, the print color, the printed size, the print style, the font used for printing, the type of symbol or barcode used for printing, a background color, and a foreground color of an object at a particular print position can be set for objects in the print data. Printing in many different format is therefore possible.

(9) A pattern of print positions comprises a combination of plural print positions. When the print positions of plural objects specified by plural commands acquired by the print data acquisition unit 15c match the combination of the pattern, the print data processing unit 15d executes the process. As a result, input data to be processed can be identified more accurately by the pattern of print positions.

Because the print data processing unit 15d processes the print data when the print position of an object containing text specified by a command matches the combination in a pattern, print data to be processed can be identified more accurately.

(10) When print data to be printed in one or multiple colors is input, the printer control unit 15 of the printer 10 in this embodiment of the invention outputs data to be printed with more colors than in the input print data. The printer control unit 15 includes a print data acquisition unit 15c, print data processing unit 15d, and print control unit 15e. A pattern related to a combination of plural print positions is set in the printer 10. The print data acquisition unit 15c acquires data indicating the print objects to be printed, and a command specifying the print position of the object. When the print positions of the plural objects specified by the plural commands acquired by the print data acquisition unit 15c matches the pattern, the print data processing unit 15d executes processes such as a process that determines the attributes related to printing the objects and a process that replaces an object with another object. The print control unit 15e then prints the objects indicated by the data acquired by the print data acquisition unit 15c at the print positions specified by the commands to reflect processing by the print data processing unit 15d.

As a result, a process that increases the number of colors used to print objects, or replaces an object with another object with more colors can be executed, and data enabling more colorful printing can be generated. By setting a pattern related to a combination of plural print positions as the condition for executing the process, the print data to be processed can be selected from print data input for a variety of print jobs. A desired print job can therefore be identified using detailed conditions, the defined process applied to only that print job, and more diverse printing is possible.

(11) Attributes related to the printing format of objects are set for individual print positions based on a pattern by the process configuration data 16a. The print data processing unit 15d determines attributes set relationally to print positions specified by commands as the attributes related to printing individual objects in the process. As a result, when the print data matches a pattern, attributes of the printing format corresponding to the print position of an individual object can be set for each object in the print data. As a result, plural objects can be processed individually for more diverse printing.

A preferred embodiment of the invention is described above, but the foregoing embodiment can be modified in many ways without departing from the scope of the invention. Some examples of such variations are described below.

For example, the control device 11 and printer 10 are not limited to being connected over a network N, and may be connected 1:1 by a USB cable or other wired communication means, or connected through a wireless LAN or other wireless communication means. Furthermore, the number of ink colors used by the printer 10 may be two such as black and another color, four such as CMYK inks as described above, and configurations using even more colors of ink are also conceivable. Furthermore, the printer 10 may be any type of printer cable of color printing, including thermal transfer printers, dye sublimation printers, and color laser printers. Furthermore, the function blocks shown in FIG. 2 can be embodied by the cooperation of hardware and software, and do not suggest a specific hardware configuration. Furthermore, the functions of the function blocks of the printer 10 and control device 11 may be executed by other externally connected device. The printer 10 and control device 11 can also operate as described above by running programs stored on an externally connected storage medium.

REFERENCE SIGNS LIST

1 printing system
10 printer (printing device)
11 control device
12 touch panel
15 printer control unit (control unit)
15*a* web application execution unit (control unit)
15*b* parameter setting unit
15*c* print data acquisition unit (acquisition means)
15*d* print data processing unit (processing means)
15*e* print control unit (print control means)
17 print unit
23 control device control unit
23*a* browser execution unit
24 display unit

The invention claimed is:

1. A print control device comprising:
an external device interface configured to communicate with an external device; and
a controller configured to receive print data from the external device and to generate image data based on the received print data, the print data including a print object and a position command corresponding to the print object, the position command specifying a coordinate of a point in printable area, the print object being positioned based on the point;
wherein the controller is configured such that:
when the controller receives first print data as the print data, the first print data including a first print object, the controller:
accepts a first input selecting the first print object, and a second input specifying a process for the selected first print object, and
generates process configuration data including the coordinate and the process corresponding to the coordinate, based on:
(a) a first coordinate specified by the position command corresponding to the first print object selected by the first input, and
(b) the process specified by the second input, when the controller receives second print data as the print data after the controller receives the first print data, the second print data including a second print object, the controller:
determines whether a second coordinate specified by the position command corresponding to the second print object matches the coordinate included in the process configuration data, and
when the controller determines that the second coordinate matches the coordinate included in the process configuration data, generates the image data including the second print object modified by executing the process corresponding to the coordinate in the process configuration data.

2. The print control device described in claim 1:
wherein the controller is configured to generate a first image data for displaying based on the first print data; and
wherein the controller is configured to accept the first input and the second input after the first image data is displayed.

3. The print control device described in claim 1, wherein the process specified by the second input includes at least one of (i) changing a print color of the print object, or (ii) replacing the print object with a different print object having a print color different from that of the print object.

4. The print control device described in claim 1:
wherein the controller is configured to accept a third input specifying a condition under which the process for the second print object is executed; and
wherein the controller generates the process configuration data further including at least one of (i) content data of the print object, or (ii) a pattern of a plurality of the points in printable area.

5. The print control device described in claim 1:
wherein the controller is configured such that, after the controller generates the process configuration data, the controller generates second image data including the first print object modified by executing the process specified by the second input.

6. The print control device described in claim 1 further comprising:
a print head configured to print;
wherein the controller is configured such that, after the controller generates the process configuration data, the controller:
generates second image data including the first print object modified by executing the process specified by the second input, and
controls the print head to print according to the generated second image data.

7. A data processing method comprising:
providing a controller configured to receive print data from an external device and to generate image data based on the received print data, the print data including a print object and a position command corresponding to the print object, the position command specifying a coordinate of a point in printable area, the print object being positioned based on the point;
receiving, with the controller, first print data as the print data, the first print data including a first print object;
accepting, with the controller, a first input selecting the first print object, and a second input specifying a process for the selected first print object; and
generating, with the controller, process configuration data including the coordinate and the process corresponding to the coordinate, based on:

(a) a first coordinate specified by the position command corresponding to the first print object selected by the first input, and (b) the process specified by the second input;

receiving, with the controller, second print data as the print data after the process configuration data is generated, the second print data including a second print object;

determining, with the controller, whether a second coordinate specified by the position command corresponding to the second print object matches the coordinate included in the process configuration data; and when it is determined that the second coordinate matches the coordinate included in the process configuration data, generating, with the controller, the image data including the second print object modified by executing the process corresponding to the coordinate in the process configuration data.

8. The data processing method described in claim 7 further comprising:

generating first image data for displaying based on the first print data;

wherein accepting the first input and the second input is executed after the first image data is displayed.

9. The data processing method described in claim 7, wherein the process specified by the second input includes at least one of (i) changing a print color of the print object, or (ii) replacing the print object with a different print object having a print color different from that of the print object.

10. The data processing method described in claim 7 further comprising:

accepting, with the controller, a third input specifying a condition under which the process for the second print object is executed;

wherein the generated process configuration data further includes at least one of (i) content data of the print object, or (ii) a pattern of a plurality of the points in printable area.

11. The data processing method described in claim 7 further comprising:

generating, with the controller, second image data after generating the process configuration data, the second image data including the first print object modified by executing the process specified by the second input.

12. The data processing method described in claim 7 further comprising:

generating, with the controller, second image data after generating the process configuration data, the second image data including the first print object modified by executing the process specified by the second input; and printing, with a print head, according to the generated second image data.

* * * * *